March 13, 1928.  1,662,785
J. ROBERTSON
LAWN MOWER COMB ATTACHMENT
Filed Sept. 13, 1926 2 Sheets-Sheet 1
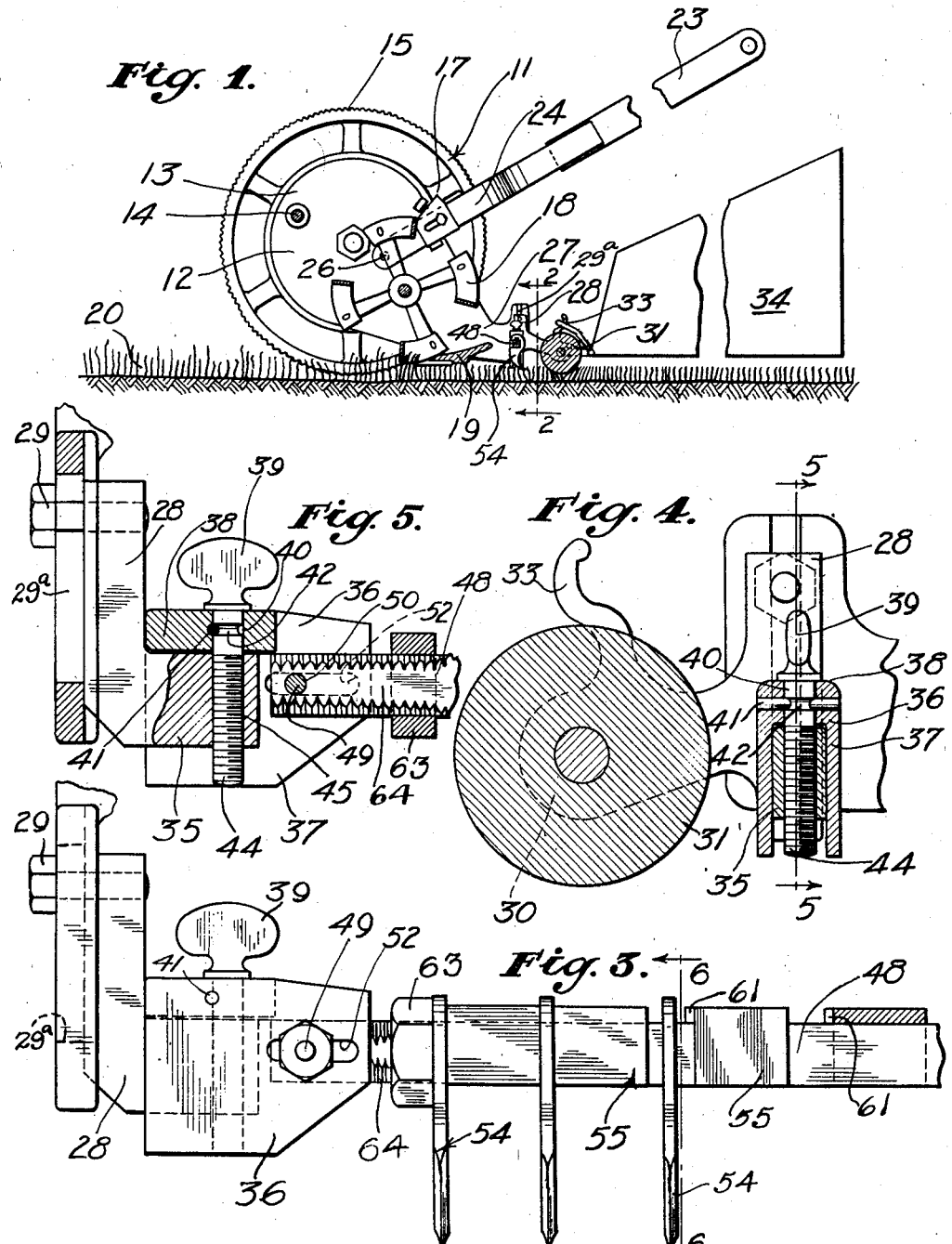
INVENTOR:
JOHN ROBERTSON
BY
ATTORNEY.

March 13, 1928. 1,662,785
J. ROBERTSON
LAWN MOWER COMB ATTACHMENT
Filed Sept. 13, 1926   2 Sheets-Sheet 2
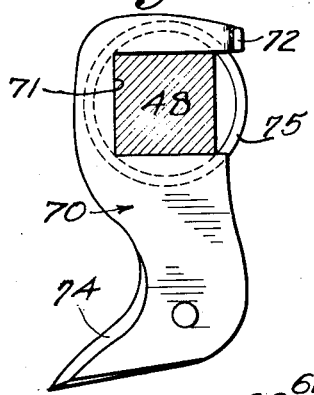
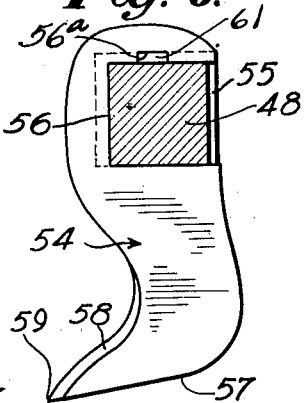
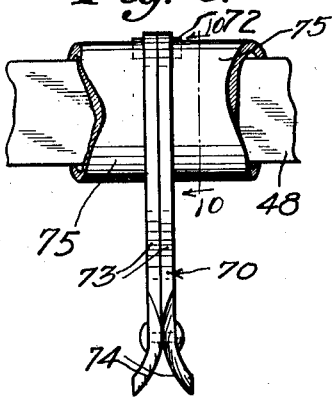
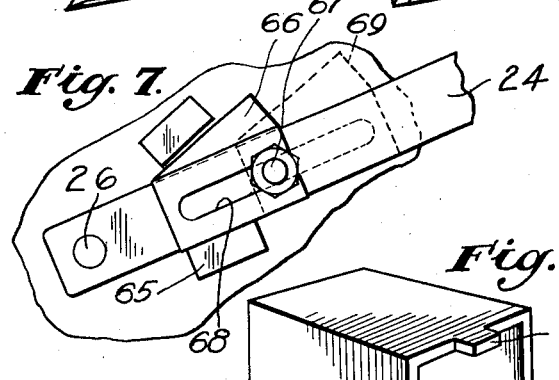
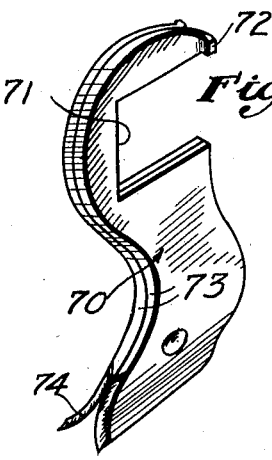
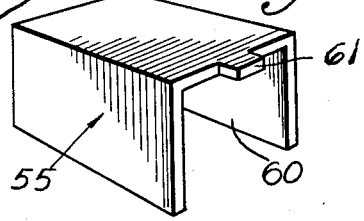
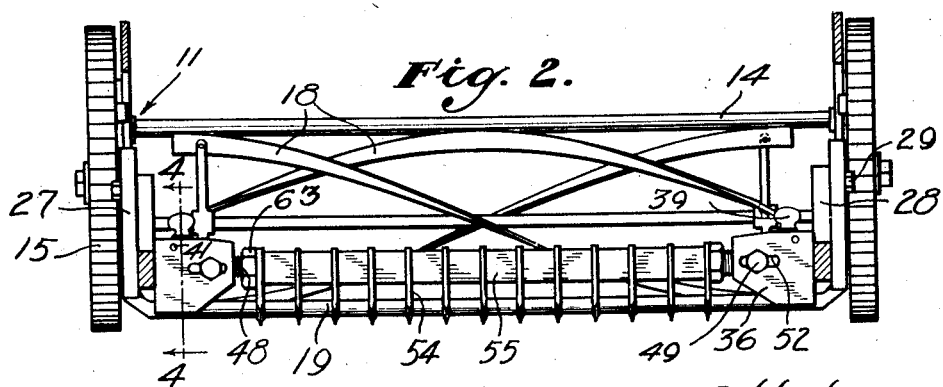
INVENTOR:
JOHN ROBERTSON
BY Fad A. Kami
ATTORNEY.

Patented Mar. 13, 1928.

1,662,785

UNITED STATES PATENT OFFICE.

JOHN ROBERTSON, OF PASADENA, CALIFORNIA.

LAWN-MOWER COMB ATTACHMENT.

Application filed September 13, 1926. Serial No. 135,016.

My invention relates to the ridding of a lawn of noxious weeds and particularly to a novel lawn mower comb attachment which is of assistance in removing noxious weeds from a lawn.

Lawns of the Southwestern States, and certain other sections of the country, are infested with and overrun by a species of wild grass known as "Bermuda" or "devil" grass, which rapidly spreads in a lawn, strangling the growth of clover, blue-grass and other desirable grasses, often taking entire possession of the lawn surface.

The Berumda grass root system spreads at varying depths by means of rhizomes, any nodule of which forms the nucleus for a new plant from which new roots radiate. Surface runners which root and grow from every nodule or joint rapidly spread the plant and form an interlocking matted growth over the surface of the ground which prevents the proper amount of air and moisture from reaching the roots of the desirable grasses and very quickly kills them. Bermuda grass, since it kills the desirable grass and is very obnoxious in appearance, is highly undesirable on lawns and it is a common practice to eliminate as far as possible the surface runners by deep raking, using a special form of rake having sharpened cutting tines or teeth which will cut into the ground and partially destroy the root system near the surface. The method commonly used is to first rake the lawn in several directions, then use a lawn mower to cut the raised runners, and by alternately raking and mowing, clear the lawn preparatory to re-sowing of clover and grass seed.

The above described method now in general use is both strenuous and costly, requiring considerable time and the employment of pressure sufficient to force the rake into the matted growth and the surface of the ground. It is unsatisfactory also as the runners raised during raking either flatten or are trampled down before mowing, so that they are only partially cut and removed by the mower.

It is an object of this invention to combine into one machine both a rake and mower which cooperate in order to remove devil grass and other noxious weeds from a lawn. My invention materially reduces both the cost and labor of removing Bermuda grass from a lawn. The lawn mower comb attachment of my invention replaces the ordinary hand rake and is preferably mounted behind the cutting members of the lawn mower, operating during the back stroke of the mower to cut and lift the matted growth into a position to be cut by the blades of the lawn mower when the lawn mower is pushed forwardly.

It is another object of my invention to provide a novel form of lawn mower comb attachment in which the teeth are readily removable and replaceable.

A further object of the invention is to provide a lawn mower comb attachment which may be readily adjustable vertically so that any depth of combing action may be obtained.

A still further object of the invention is to provide a lawn mower comb attachment in which one size may be used on different widths of lawn mower.

Other objects and advantages of the invention will appear throughout the following description which is used in connection with diagrammatic drawings.

Referring to the drawings,

Fig. 1 is a section showing the lawn mower comb attachment of the invention in use.

Fig. 2 is a section taken on the line 2—2 of Fig. 1.

Fig. 3 is an enlarged fragmentary section of one end of the invention showing the manner in which the parts are assembled and dismantled.

Fig. 4 is a section taken on the line 4—4 of Fig. 2.

Fig. 5 is a section taken on the line 5—5 of Fig. 4.

Fig. 6 is a section taken on the line 6—6 of Fig. 3.

Fig. 7 is a fragmentary view showing a means for locking the handle of the lawn mower against movement relative to the frame construction of the lawn mower.

Fig. 8 is a perspective view of a double tooth.

Fig. 9 is a fragmentary rear elevation of the tooth shown in Fig. 8 assembled in a comb.

Fig. 10 is a section taken on the line 10—10 of Fig. 9.

Fig. 11 is a view illustrating the form of spacer used in the preferred form of the invention.

Referring to the drawings in detail, the numeral 11 represents a lawn mower having a carriage 12 which is provided with end plates 13 which are attached together by a cross rod 14. The end plates 13 rotatably support wheels 15 and spiders 17 which support movable cutting blades 18. The movable cutting blades 18 cooperate with a stationary cutting blade 19 which is located near the lower part of the lawn mower in a position to assist in cutting grass, indicated at 20, when the lawn mower is operated in a forward direction. The lawn mower is provided with a handle 23 which is attached to the carriage 12 by a yoke 24 which is pivoted thereto, as indicated at 26.

The end plates 13 have rearwardly extending arms 27, to the rear ends of which brackets 28 of the invention are secured. The ordinary lawn mower is provided with brackets, which brackets are removed and replaced by brackets 28 which are of a special construction and adapted to support the comb attachment of this invention. The brackets 28 are secured to the rear ends of the arms 27 by means of cap screws 29 passing through slots 29ª formed in the arms 27. The brackets 28, as illustrated in Fig. 4, have arms 30 which support a roller 31 and have fingers 33 by means of which a grass catcher 34 may be supported in position to catch the grass which is cut by the movable and stationary cutters 18 and 19 of the lawn mower.

Extending inward and formed integral with each bracket 28 is a lug 35. Carried by each lug 35 is an attachment plate 36 which is U-shaped, as shown, having side walls 37 and a top wall 38. Carried by each of the attachment plates 36 is an adjustment screw 39 which extends through an opening 40 in the upper wall thereof, said screw being secured in place by means of a pin 41 extended into an annular channel 42 of the screw. The lower threaded end 44 of each adjustment screw 39 is screwed into a vertical opening 45 formed through each lug 35. By rotating the adjustment screws 39, the attachment plates 36 may be moved up or down relative to the lawn mower 11. Extending across the lawn mower 11 between the stationary cutting blade 19 and the roller 31 is a cross bar 48 of the invention. The cross bar shown is made of rectangular cross section. The ends of the cross bar 48 extend into spaces between the side walls 37 of the attachment plate 36 and are secured thereto by means of a bolt 49 which extends through an opening 50 in each end of the cross bar 48 and through elongated slots 52 formed in the side walls 37, the slots 52 being elongated in a horizontal plane.

Carried by the cross bar 48 are teeth 54 which are held in proper spaced relationship by spacers 55. As shown in Fig. 6, the teeth 54 are stamped from flat plates and are provided with recesses 56. The recesses 56 are open at the front of each tooth 54 and are substantially rectangular so as to closely fit the faces of the rectangular bar 48. The cooperation of the walls of the slots 56 with the bar 48 prevents the teeth from rotating on the bar. A notch 56ª is formed in the upper edge of each slot 56 as shown in Fig. 6. The lower ends of the teeth 54 have faces 57 which extend rearward and downward, meeting rear cutting edges 58, thus forming a rear point 59. The spacers 55 are channel-shape in form, having channels 60 which are of such size as to receive the bar 48 but not allow any material lateral play of the spacer on the bar. On one end of each spacer 55 is formed a lug 61, as clearly shown in Fig. 11. In assembling the teeth 54 and the spacers 55 on the cross bar 48, the spacers are interspersed between the teeth, and the teeth and spacers are then shifted together causing the lugs 61 to extend into the notches 56ª of the teeth 54 so that neither the teeth nor the spacers may be removed from the bar 48 until they have been separated longitudinally from each other.

The teeth and spacers are clamped together in assembled relation on the bar 48 by end nuts 63 which are threadedly received upon end portions 64 of the bar 48, which end portions have their corners turned down and threaded, as clearly shown in Fig. 5.

I have found that the comb operates more successfully and easier if the handle is locked from vertical swinging relative to the carriage 12 of the lawn mower; therefore, I provide a means for locking the lawn mower carriage 12 and the handle 23 when the comb of the invention is to be used. Referring to Fig. 7, the end plates 13 are ordinarily provided with stops 65 which allow the yoke some latitude of movement. My invention provides a wedge-shaped lock member 66 which may be secured to the arms of the yoke 24 by a bolt 67, the bolt 67 extending through a slot 68 of the yoke 24. When the wedge-shaped stop 66 is in the position shown in full lines, the handle 23 will be locked from swinging movement. However, when the comb attachment is not in use the stop 66 may be moved into the position indicated by dotted lines 69, in which position the handle 23 is free to swing vertically, being limited only by the stops 65.

As previously explained, the comb attachment of the invention is arranged to operate during the back stroke of the comb. The points 59 of the teeth 54 are therefore extended rearwardly, the lower ends thereof extending below the plane of the stationary blade 19. The operation of the invention disclosed herein is similar to that of the invention embodied in my application entitled Grass rake for lawn mower, filed December 8, 1925, Serial No. 73,986. In that application, I disclosed a grass rake disposed in a similar position to that of the comb of this invention and in which the opposite ends of the rake are vertically adjustable. No provision is made in said rake, however, for permitting removal of the teeth for sharpening them or replacing them with new teeth.

When the lawn mower 11 is pulled rearwardly, the cutting edges of the teeth 54 tend to extend under the layers of Bermuda grass or other noxious weeds and to simultaneously cut them and lift them. On the rearward pull the weight and impetus of the lawn mower contribute very much to the successful operation of the comb. When the lawn mower is moved forwardly, the noxious weeds or grass which have been cut and raised so that they extend up are in such a position in front of the lawn mower that they are readily cut and thrown into the attached grass catcher when the lawn mower is moved in a forward direction. The points 59 may be moved vertically into any desired position according to the depth of the Bermuda grass by merely operating the adjustment screws 39 which support the attachment plates 36. The attachment plates and the cross rod 48 may thus be elevated or depressed so that any desired position of the teeth 54 may be obtained.

A very important feature of the invention is the removability of the teeth 54. It may be desirable to remove the teeth, to sharpen them, or to replace or exchange them. In such a case it is not necessary to remove the entire comb attachment but it is only necessary to loosen the nuts 63 so that the spacers 55 and teeth 54 may be spread as shown in the right part of Fig. 3. This removes the spacers 55 from locking engagement with the teeth 54, thus permitting the teeth 54 to be pulled rearwardly from the cross bar 48. This is a very simplified construction for permitting the teeth to be removed, yet rigidly held in place when assembled.

It should be understood that various modifications of the invention might be made without departing from the spirit and scope thereof. For example, I have shown a modified form of tooth and spacer in Figs. 8, 9 and 10. Referring to these figures I show a tooth 70 having a rectangular slot 71 and ears 72. The tooth 70 is made of two layers of metal 73 and is provided with double cutting edges 74. These cutting edges 74 are adapted to imbed deeply in the Bermuda grass and noxious weeds and they will probably more effectively remove them than will the tooth 54 shown in Figs. 1 to 7 inclusive.

The slot 71 of the tooth 70 is adapted to snugly receive the square bar 48, the tooth being held on this bar by tubular spacers 75 which engage the ears 72 when these spacers are shifted into contact with opposite sides of the tooth 70.

From the foregoing description it will be apparent that the rake of my invention is designed for commercial use and may be used on various types of lawn mowers. Various advantages reside in the particular design of construction which I use, these advantages being heretofore pointed out or being obvious from the description. Briefly, however, advantages accrue from the use of the brackets 28 which permit the attachment of the invention to various types of lawn mowers; the particular form of bracket 28 which I employ; the means for vertically adjusting the attachment plates 36 so that different cutting depths of the teeth 54 may be obained; the manner of removably securing the teeth 54 in place; the particular forms of teeth which the invention provides; and the means for holding the lawn mower handle from vertical movement relative to the carriage of the lawn mower. It might be pointed out that this is desirable since it prevents a tilting of the lawn mower during the back stroke thereof, and therefore prevents the comb attachment from being elevated from proper operating position.

I claim as my invention:

1. The combination of: a lawn mower having a wheeled carriage, a mowing mechanism provided thereon between the wheels thereof, a transverse roller disposed behind said mowing mechanism, and brackets carrying said roller and mounted on said carriage for vertical adjustment thereon; a toothed comb extending transversely between said mowing mechanism and said roller; and adjustable means for mounting said comb on said brackets, so that said comb is vertically movable with said brackets relative to said carriage, said adjustable means being operable to vertically adjust said comb relative to said roller.

2. A combination as in claim 1 in which the teeth of said comb face rearwardly and extend sufficiently into the grass so as to have a combing action during rearward movement of said lawn mower.

3. The combination of: a lawn mower having a wheeled carriage, a mowing mechanism provided on said carriage between the wheels thereof, and a roller mounted on said carriage and extending transversely behind said mowing mechanism; a comb having a series of cultrate teeth facing rearwardly, said comb extending transversely between said mowing mechanism and said roller; and means for mounting said comb upon said carriage for vertical adjustment thereon.

4. In combination: a carriage; wheels on said carriage; a roller provided upon said carriage, said wheels and said roller supporting said carriage in a stable position; a mowing mechanism on said carriage adapted to be operated by a forward movement of said carriage; a handle rotatably mounted upon said carriage and extending rearwardly therefrom so that said carriage may be pushed by said handle to operate said mowing mechanism; a lawn comb member mounted for vertical adjustment on said carriage and having teeth facing rearwardly when lowered and adapted to extend sufficiently into the grass to cut and raise noxious weeds when said carriage is drawn rearwardly by said handle; and means operable, when said comb member has been lowered, to lock said handle against rotation upon said carriage to prevent rocking of said carriage by the resistance of said weeds to rearward movement of said comb.

5. In combination: a carriage; wheels on said carriage; a roller provided upon said carriage, said wheels and said roller supporting said carriage in a stable position; a mowing mechanism on said carriage adapted to be operated by a forward movement of said carriage; a handle rotatably mounted upon said carriage and extending rearwardly therefrom so that said carriage may be pushed by said handle to operate said mowing mechanism; a lawn comb member rigidly mounted on said carriage; means for vertically adjusting said comb member, said comb member having teeth facing rearwardly to cause said comb, when lowered, to extend sufficiently into the grass to cut and raise noxious weeds when said carriage is drawn rearwardly by said handle; and means operable, when said comb member has been lowered, to lock said handle against rotation upon said carriage to prevent rocking of said carriage by the resistance of said weeds to rearward movement of said comb.

6. The combination of: a lawn mower having a wheeled carriage; a mowing mechanism provided on said carriage between the wheels thereof, and a roller mounted on said carriage and extending transversely behind said mowing mechanism; a toothed comb extending transversely of said lawn mower between said mowing mechanism and said roller; and means for mounting said comb upon said carriage for vertical adjustment thereon relative to said roller, the teeth of said comb facing rearwardly so as to have a combing action during rearward movement of said lawn mower.

In testimony whereof, I have hereunto set my hand at Los Angeles, California, this 7th day of September, 1926.

JOHN ROBERTSON.